April 13, 1965  L. CATES  3,178,226
SAFETY SEAT HARNESS
Filed Nov. 6, 1962  2 Sheets-Sheet 1
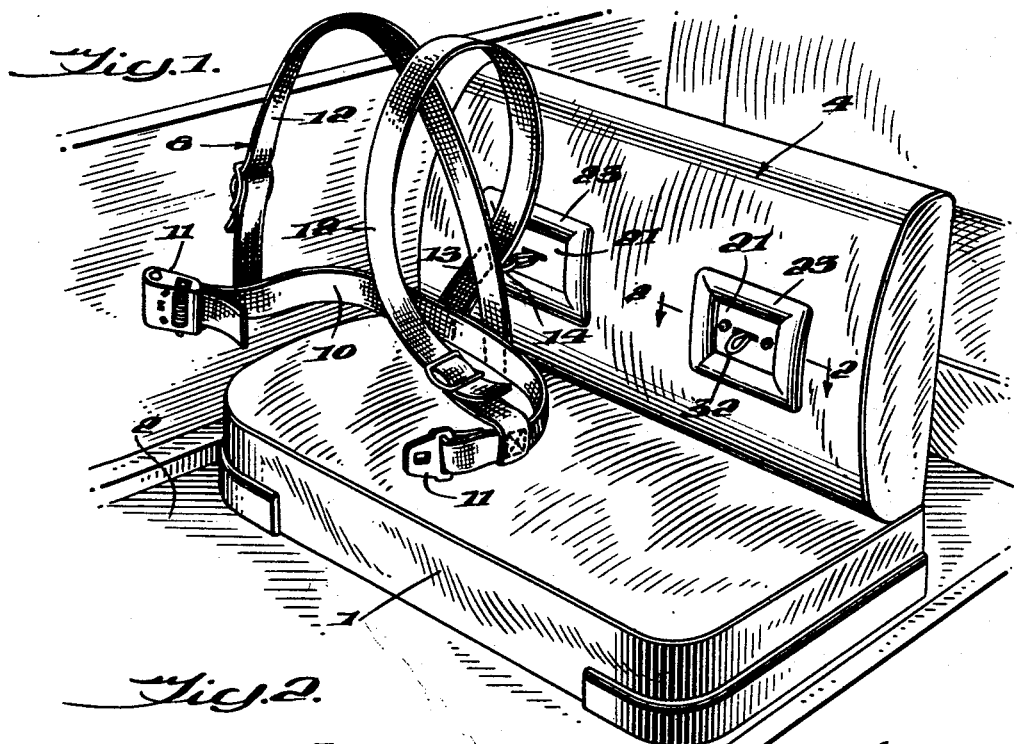
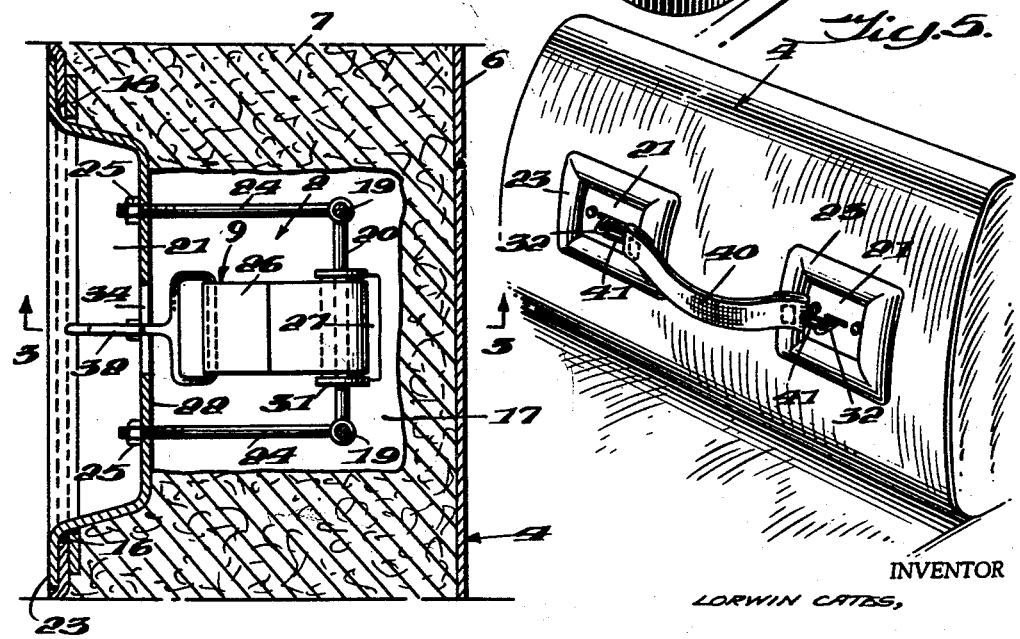
INVENTOR
LORWIN CATES,
BY E. F. Salter
ATTORNEY April 13, 1965   L. CATES   3,178,226
SAFETY SEAT HARNESS
Filed Nov. 6, 1962   2 Sheets-Sheet 2
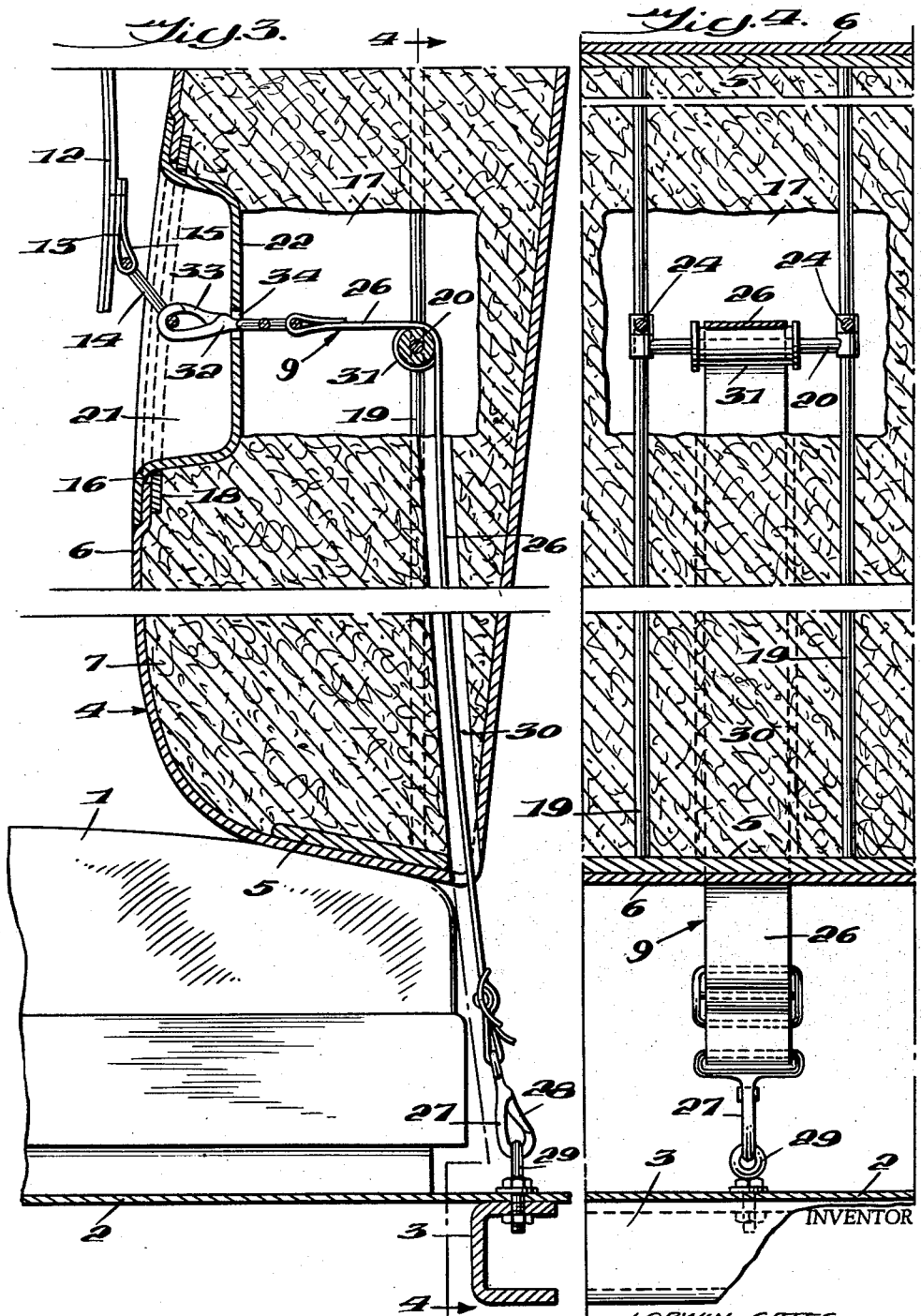
INVENTOR
LORWIN CATES,
BY E. F. Salter
ATTORNEY

United States Patent Office

3,178,226
Patented Apr. 13, 1965

3,178,226
SAFETY SEAT HARNESS
Lorwin Cates, % Naman, Howell Smith & Chase,
508 Amicable Bldg., Waco, Tex.
Filed Nov. 6, 1962, Ser. No. 235,676
9 Claims. (Cl. 297—389)

This invention relates to what are generally known as safety seat belts for automobile seats which are operative to prevent a person from being thrown forwardly or out of a car in the event of a collision or the sudden stopping of a car.

Safety seat belts in general use today comprise a pair of spaced apart straps each having one end thereof permanently secured to the car floor or frame. The other ends of the straps are provided with cooperating releasable fastening means by which the straps are secured about the waist of a person sitting on a car seat. Safety belts of this type have certain inherent defects. First, the locating of the ends of the straps and the fastening thereof about a person sitting on the seat is so slow and tedious that frequently a person does not bother to use the safety belt even though his car is equipped with one. This is especially true when a person has occasion to make frequent stops and get in and out of a car. And second, since the belt is secured only about the waist of a user it does not prevent a person from being thrown forwardly from the waist up in the event of a collision or sudden stopping of the car. Also, since the belt is secured only about the waist of a person it may cause abdominal injuries to the user in the event of a collision. Such belts, therefore, do not afford a user maximum protection.

One of the principal objects of this invention is to provide a safety seat belt device which is so constructed and arranged that it can be quickly and easily connected to and disconnected from a person while sitting on an automobile seat.

Another object of the invention is to provide a safety seat belt device which is so constructed and arranged that it permits a user to have maximum freedom of movement while at the same time it affords the user maximum protection in case of accident.

In accordance with the invention the safety seat belt device consists of two sections, one of which comprises a harness which is adapted to be worn by a user and the other of which comprises a restraining means is permanently incorporated in an automobile seat back and is securely connected to the automobile floor or frame. The harness and restraining means are provided with interengageable means by which the harness can be quickly and easily connected to and disconnected from the restraining means. The construction is such that the device is especially adapted for use by delivery men, rural mail carriers and others who have occasion to make frequent stops and get in and out of a car.

Having stated the principal objects of the invention, other and more specific objects thereof will be apparent from the following specification and the accompanying drawing forming a part thereof in which:

FIG. 1 is a perspective view of an automobile seat showing a safety seat belt device constructed according to my invention applied thereto;

FIG. 2 is a fragmentary horizontal section taken substantially on the line 2—2 of FIG. 1;

FIG. 3 is a fragmentary vertical section taken substantially on the line 3—3 of FIG. 2;

FIG. 4 is a fragmentary vertical section taken substantially on the line 4—4 of FIG. 3; and FIG. 5 is a perspective view of an automobile seat back showing a slightly modified form of the invention applied thereto.

Referring now to the drawings by reference characters the numeral 1 indicates a conventional automobile seat which is suitably secured to the floor 2 of an automobile, and the numeral 3 indicates one of the cross bars of the automobile frame. The seat 1 is provided with the usual seat back 4 which comprises a rectangular metal frame 5 which is enclosed within a flexible casing 6 along with suitable resilient padding 7.

The safety seat belt device of the invention consists of a harness, generally indicated by the numeral 8, and a restraining means generally indicated by the numeral 9.

The harness 8, which is adapted to be worn by the user both in and out of the automobile, comprises an adjustable belt 10, which is adapted to be secured about the waist of a user by a buckle 11, and a pair of adjustable shoulder straps 12 which are secured to the belt 10 and are adapted to extend up from the belt 10 and over the shoulders of a user. The straps 12 which are diagonally disposed with respect to each other cross each other, behind the back of a user, where they are permanently sewed together as indicated at 13. A ring 14 is permanently secured to the overlapping sections of the straps 12 by any suitable means as indicated at 15.

A portion of the front wall of the casing 6 of the seat back 4 is cut out to provide a rectangular opening 16 behind which a portion of the padding 7 is removed to provide a chamber 17. A rectangular reinforcing frame 18, which surrounds the opening 16, is sewed or otherwise secured to the inner face of the casing 6. The seat back 4 is reinforced by a pair of transversely spaced vertical tubular rods 19 which are permanently secured to and between the upper and lower flights of the seat back frame 5 and extend through the chamber 17. A horizontally disposed tubular bar 20 is secured to and between the vertical rods 19 within the chamber 17. A rectangular metallic cup 21 having a bottom wall 22 and an outwardly extending peripheral flange 23 is inserted through the opening 16 into the chamber 17 with the flange 23 engaging the outer surface of the casing 6 about the opening 16. The cup 21 is retained in place by a pair of elongated bolts 24 which are secured to the rods 19 and extend out through suitable apertures in the bottom wall 22 of the cup 21 and are provided with nuts 25.

The restraining means 9 comprises an adjustable belt 26 having a snap hook 27, with a spring keeper 28, secured to the lower end thereof. The belt 26 is detachably connected, by the hook 27, to an anchoring eye-bolt 29 which is bolted to the frame cross bar 3 behind the seat 1. The belt 26 extends upwardly from the anchor 29 through a passageway 30 in the padding 7 into the chamber 17 and then forwardly over a roller 31, mounted on the bar 20, towards the cup 21. The upper end of the belt 26 is provided with a snap hook 32, having a spring keeper 33, which projects out into the cup 21 through a slot 34 in the bottom wall 22 thereof. The length of the belt 26 is so adjusted that the hook 32 does not extend out beyond the perimeter of the cup 21, as shown in FIGS. 2 and 3, and therefore cannot engage the back of a person sitting on the seat 1 regardless of whether or not the harness 8 is being worn.

When the safety device is used the belt 10 of the harness 8 is fastened about the waist of a person, by the buckle 11, with the straps 12 extending over one's shoulders, and the ring 14 is snapped into the hook 32. Then in case of an accident the strap 26, through the ring 14 and harness 8, will prevent a person from being thrown from the car or forwardly against the dash or steering wheel. Also a pull on the upper end of the restraining strap 26 due to an accident will tend to force the whole seat downwardly against the car floor and thereby minimize the possibility of the seat being torn loose from the floor. As previously stated the harness 8 may be worn both in and out of the car so that a person who wishes to get out of the car for a short period of time needs only to unsnap the ring 14 from the hook 32, and then when he returns to the car merely re-snap the ring 14 in the hook 32.

In accordance with the invention it is contemplated that a full width car seat will be provided with two transversely spaced similar safety seat belt devices, as shown in FIGS. 1 and 5, in order to afford protection to two persons sitting on the seat.

FIG. 5 discloses a slightly modified form of the invention by which a third person, such as a child, sitting on the seat can also be afforded protection. This form of the invention comprises a strap 40 having a ring 41 secured to each end thereof. When used the strap 40 is placed across the waist of a person sitting on the seat between two other people and the rings 41 snapped into the hooks 32 of the two spaced restraining means 9.

From the foregoing it will be apparent to those skilled in this art that I have provided a relatively simple, yet very efficient device for accomplishing the objects of the invention.

It is to be understood that I am not limited to the specific construction shown and described herein as various modifications may be made therein within the spirit of the invention and the scope of the appended claims.

What is claimed is:

1. A safety seat belt device of the character described comprising a harness which is adapted to be worn by a user, a restraining means which is adapted to be mounted in a car seat back having a chamber therein which is provided with an opening through the front wall of the car seat back and a passageway which extends downwardly between said chamber and an opening through the bottom portion of said car seat back, and a pair of cooperating quickly detachable connecting members, one of which is secured to said harness and the other of which is secured to said restraining means, by which said harness is adapted to be connected to and quickly detached from said restraining means; said restraining means comprising a transversely extending roller rotatably mounted on fixed supporting means within said chamber, an elongated strap which is adapted to have the lower end thereof anchored to a fixed element of said car and which extends upwardly therefrom through the passageway within said car seat back into said chamber and thence forwardly over said roller towards the front wall of said car seat back, one of said cooperating connecting members being secured to the upper forward end of said strap and extending outwardly through the opening in the front wall of the car seat back for connection to the cooperating connecting member secured to said harness.

2. A safety seat belt device as defined by claim 1 in which said fixed supporting means comprises a pair of transversely spaced vertically disposed reinforcing rods which are secured to and between the upper and lower flights of the rectangular seat back frame and extend upwardly through said chamber and a transversely extending horizontally disposed bar connected to and between said rods within said chamber on which said roller is rotatably mounted.

3. A safety seat belt device as defined by claim 2 in which said harness comprises a belt which is adapted to be secured about a user's waist and a pair of crossing shoulder straps which are permanently secured to said belt and are adapted to encompass a user's shoulders.

4. A safety seat belt device as defined by claim 3 in which said cooperating connecting members comprise a snap hook which is secured to the upper forward end of said strap and a ring which is secured to the crossing portions of said shoulder straps.

5. A safety seat belt device of the character described comprising a harness which is adapted to be worn by a user, a restraining means which is adapted to be mounted in a car seat back having a chamber therein which is provided with an opening through the front wall of the car seat back and a passageway which extends downwardly between said chamber and an opening through the bottom portion of said car seat back, and a pair of cooperating quickly detachable connecting members, one of which is secured to said harness and the other of which is secured to said restraining means, by which said harness is adapted to be connected to and quickly detached from said restraining means; said restraining means comprising a pair of transversely spaced vertically disposed reinforcing rods secured to and between the upper and lower flights of the rectangular seat back frame and extending upwardly through said chamber, a transversely extending horizontally disposed bar connected to and between said rods within said chamber, a roller rotatably mounted on said bar, a cup shaped member having a bottom wall and a peripheral flange extending through said opening into said chamber with said flange engaging the outer surface of said front wall about said opening, a pair of bolts by which said cup shaped member is firmly secured in position, one of said bolts being secured to each of said rods and extending forwardly therefrom through apertures in the bottom wall of said cup shaped member and having nuts applied to the threaded outer ends thereof, an elongated strap which is adapted to have the lower end thereof anchored to a fixed element of said car and extending upwardly therefrom through the passageway in said car seat back and thence forwardly over said roller towards said cup shaped member, one of said cooperating connecting members being secured to the upper forward end of said strap and extending out through a slot in the said bottom wall into said cup shaped member for connection to the cooperating member secured to said harness.

6. A safety seat belt device as defined by claim 5 in which said harness comprises a belt which is adapted to be secured about a user's waist and a pair of crossing shoulder straps which are permanently secured to said belt and are adapted to encompass a user's shoulders.

7. A safety seat belt device as defined by claim 6 in which one of said pair of cooperating connecting members comprises a snap hook which is secured to the upper forward end of said strap and the other of which comprises a ring which is secured to said harness.

8. A safety seat belt device of the character described comprising a harness which is adapted to be worn by a user, a restraining means which is adapted to be mounted in a car seat back having a chamber therein which is provided with an opening through the front wall of the car seat back and a passageway which extends downwardly between said chamber and an opening through the bottom portion of said car seat back, and a pair of cooperating quickly detachable connecting members, one of which is secured to said harness and the other of which is secured to said restraining means, by which said harness is adapted to be connected to and quickly detached from said restraining means; said restraining means comprising a pair of transversely spaced vertically disposed reinforcing rods secured to and between the upper and lower flights of the rectangular seat back frame and extending upwardly through said chamber, guide means supported by and between said rods within said chamber, a cup shaped member having a bottom wall and a peripheral flange extending through said opening into said chamber with said flange engaging the outer surface of said front wall about said opening, interconnecting means between said cup shaped member and said vertically disposed reinforcing rods by which said cup shaped member is firmly secured in position, an elongated strap which is adapted to have the lower end thereof anchored to a fixed element of said car and extending upwardly therefrom through the passageway in said car seat back into said chamber and thence forwardly over said guide means toward said cup shaped member, one of said cooperating connecting members being secured to the upper forward end of said strap and extending outwardly through a slot in the said bottom wall into said cup shaped member for connection to the cooperating connecting member secured to said harness.

9. A safety seat belt device of the character described comprising a harness which is adapted to be worn by a user, a restraining means which is adapted to be mounted in a car seat back having a chamber therein which is provided with an opening through the front wall of the car seat back and a passageway which extends downwardly between said chamber and an opening through the bottom portion of said car seat back, and a pair of cooperating quickly detachable connecting members, one of which is secured to said harness and the other of which is secured to said restraining means, by which said harness is adapted to be connected to and quickly detached from said restraining means; said restraining means comprising guide means disposed within said chamber, an elongated strap adapted to have the lower end thereof anchored to a fixed element of said car and which extends upwardly therefrom within the passageway within said car seat back into said chamber and thence forwardly over said guide means toward the front wall of said car seat back, one of said cooperating connecting members being secured to the upper forward end of said strap and extending outwardly through said opening for connection to the cooperating connecting member secured to said harness, said guide means comprising a pair of transversely spaced vertically disposed reinforcing rods which are secured to and between the upper and lower flights of the rectangular seat back frame and extend upwardly through said chamber, and a transversely extending horizontally disposed bar supported by and between said rods within said chamber.

References Cited by the Examiner
UNITED STATES PATENTS

| | | | |
|---|---|---|---|
| 1,298,615 | 3/19 | Wilkinson | 297—389 |
| 1,616,349 | 2/27 | Cagle | 297—389 |
| 1,898,090 | 2/33 | Lethern | 297—389 |
| 2,670,967 | 3/54 | Kean | 297—385 |
| 2,695,052 | 11/54 | Yates | 297—387 |
| 2,819,095 | 1/58 | Haltman | 297—385 |
| 2,833,344 | 5/58 | Lucht | 297—389 |
| 2,855,028 | 10/58 | Matthews | 297—388 |
| 2,856,991 | 10/58 | Princiotta | 297—389 |

FOREIGN PATENTS

| | | |
|---|---|---|
| 700,743 | 1/31 | France. |
| 177,745 | 4/22 | Great Britain. |

FRANK B. SHERRY, *Primary Examiner.*